Figure 6:
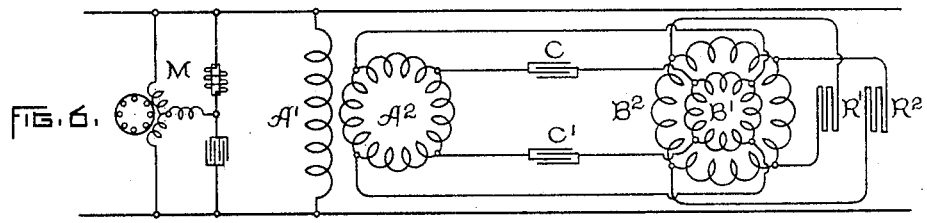
Figure 7:
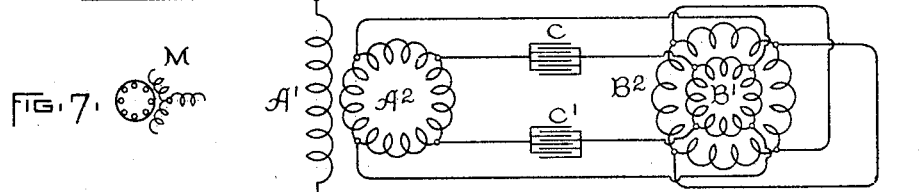

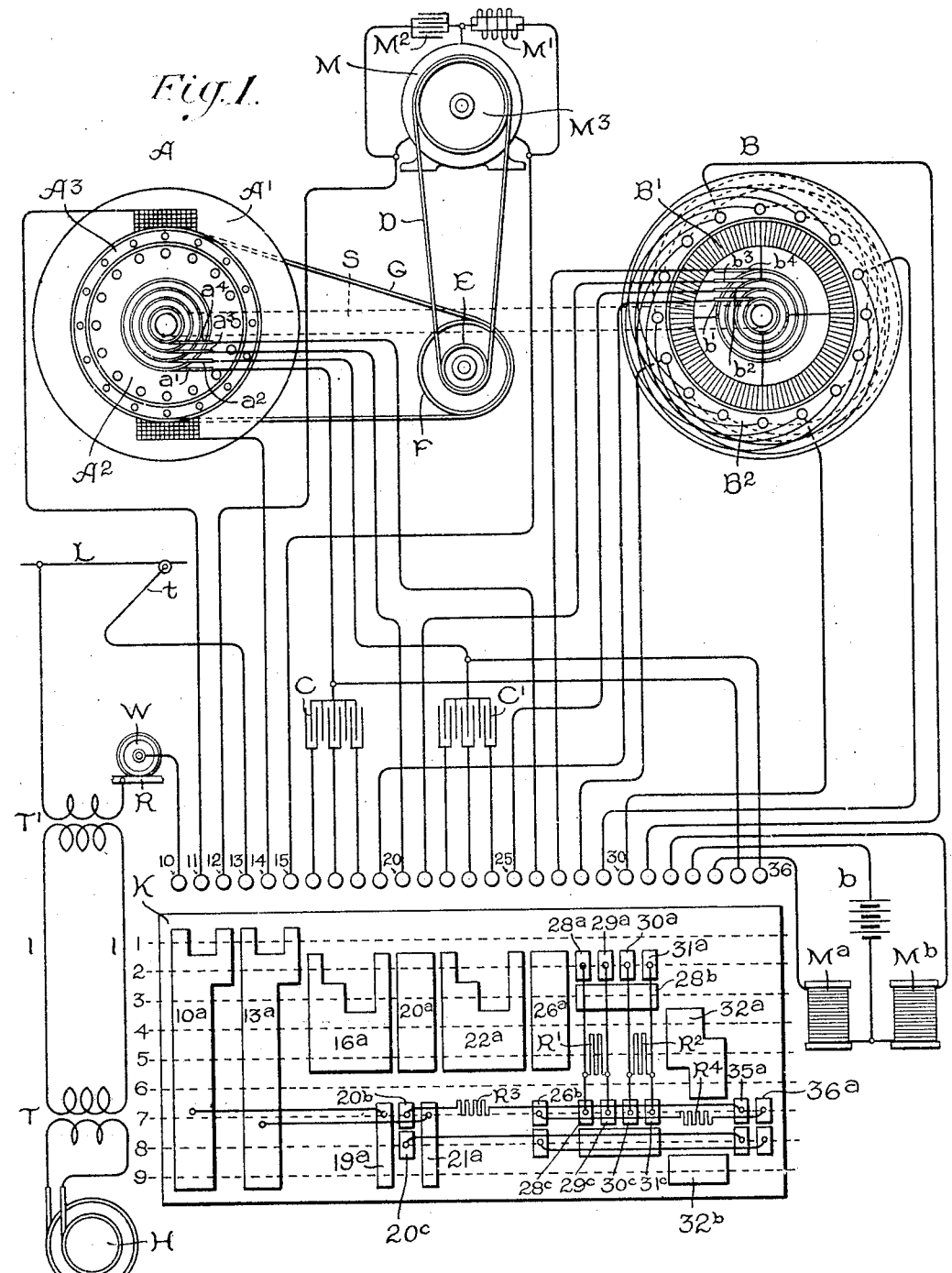

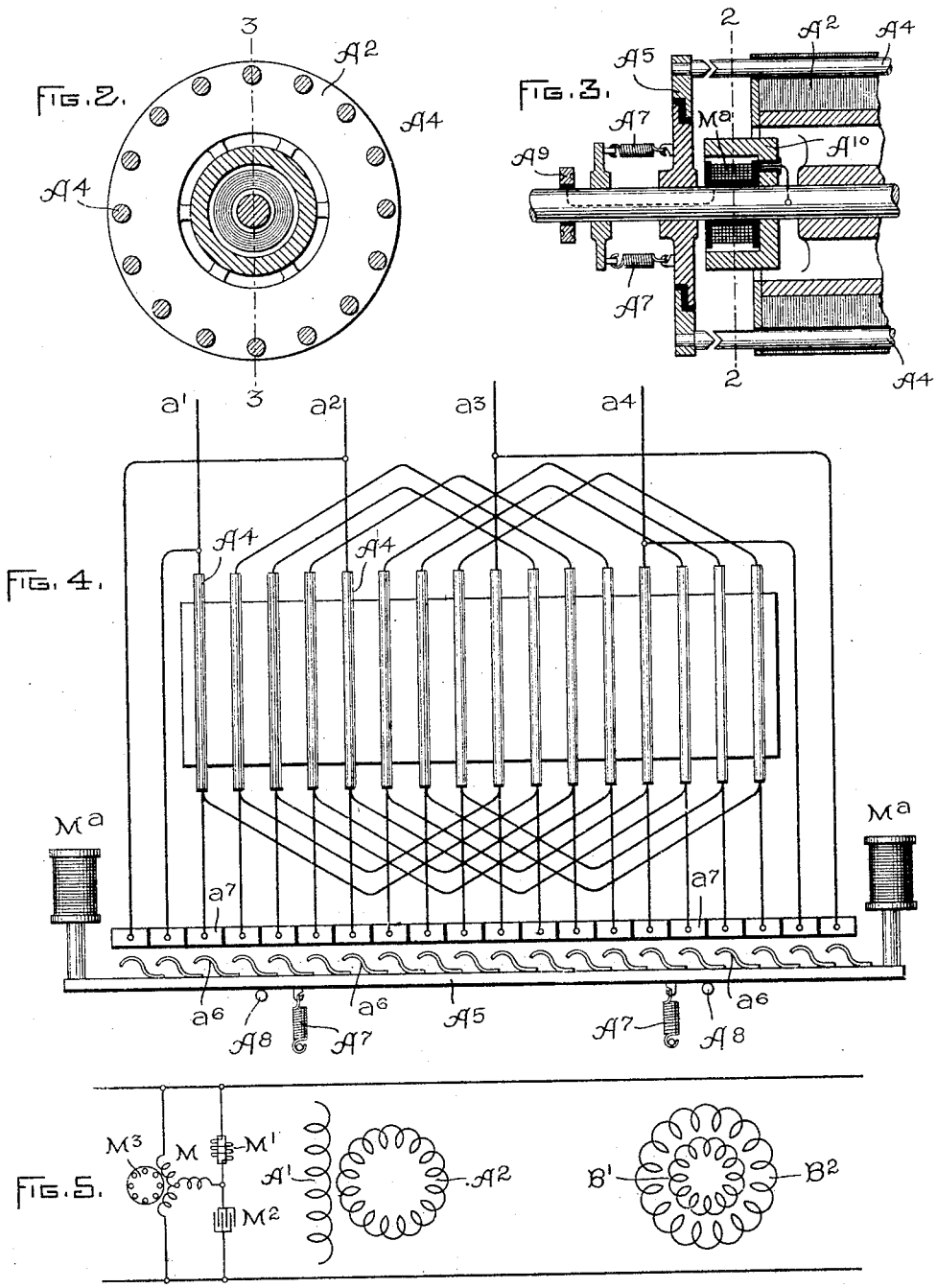

No. 805,346. PATENTED NOV. 21, 1905.
A. G. DAVIS.
ALTERNATING CURRENT MOTOR SYSTEM.
APPLICATION FILED APR. 4, 1898.

4 SHEETS—SHEET 3.

WITNESSES:
A. H. Abell.
A. F. Macdonald.

INVENTOR.
Albert G. Davis

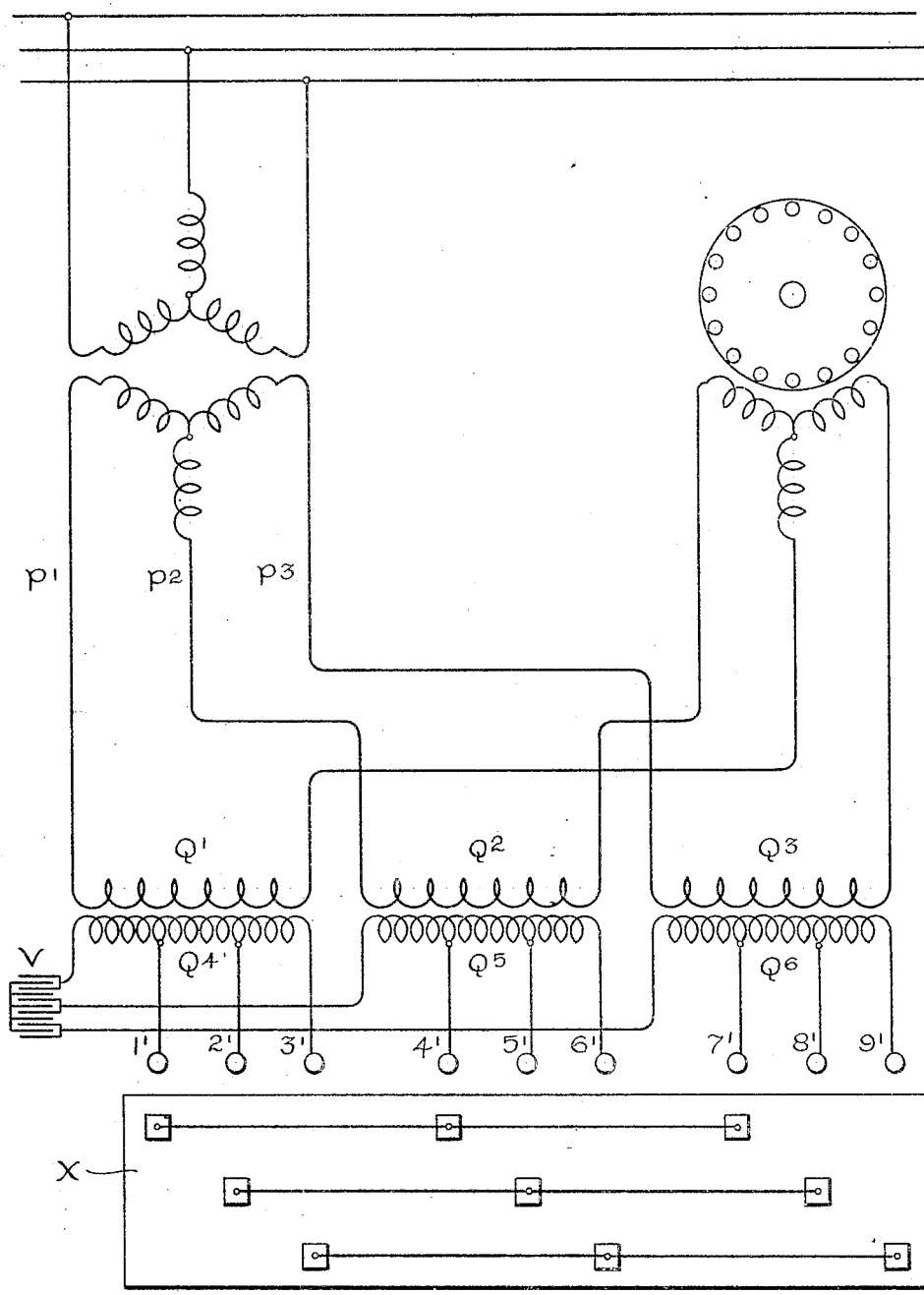

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

ALTERNATING-CURRENT MOTOR SYSTEM.

No. 805,346.  Specification of Letters Patent.  Patented Nov. 21, 1905.

Application filed April 4, 1898. Serial No. 676,306.

*To all whom it may concern:*

Be it known that I, ALBERT G. DAVIS, a citizen of the United States, residing at Schenectady, county of Schenectady, State of New York, have invented certain new and useful Improvements in Alternating-Current Motor Systems, of which the following is a specification.

My invention relates to alternating-current motor systems, and particularly to those of the tandem and tandem-multiple types, and is designed to provide an arrangement whereby such a motor system may be started with full torque and run efficiently at various speeds.

One important function of my invention consists in connecting in tandem with a single-phase alternating-current motor, actually driving a load, a multiphase alternating-current motor, also driving a load, which may be the same load as that driven by the first motor. For example, both motors may be connected to the same or different axles of a street-car. Further, my invention contemplates regulating the speed of the system thus formed in various ways and thereafter connecting the motors in tandem across the single-phase mains. In this way I am able to drive a regulable and self-starting motor system possessing the advantages of a multiphase tandem-multiple system from a source of single-phase current, which is particularly valuable in connection with railway-work.

My invention also comprises certain means for varying the resistance of the induced member of one or more of the motors, which is particularly useful when the change from tandem to multiple is made.

My invention also comprises an apparatus for neutralizing or adjusting the phase displacement in the intermediate circuits of a tandem or tandem-multiple system or in any multiphase system whatever and various other combinations and arrangements of parts and connections to be hereinafter more fully described and claimed.

I have illustrated various embodiments of my invention in the accompanying drawings, in which—

Figure 1 is a general diagrammatic view of a motor system constructed and arranged in accordance with my invention and applied to railway-work. Fig. 2 is a section on the line 2 2 of Fig. 2, and Fig. 3 is a section on the line 3 3 of Fig. 2, both sections showing details of the means for varying the armature resistance in its preferred form. Fig. 4 is a development of the induced member of one of the motors, showing diagrammatically the resistance-varying means. Figs. 5, 6, 7, 8, 9, 10, and 11 are diagrams illustrating the circuit relations of my improved system of various controller positions, and Fig. 12 shows one form of my improved means for neutralizing the self-induction and regulating the phase of the intermediate circuits.

Referring more particularly to Fig. 1, A B are the two motors, shown as connected to a common shaft S. A' B' are the inducing members, and $A^2$ $B^2$ are the induced members, the relations of the parts being reversed in the two motors. H is a generator of single-phase alternating currents, shown as feeding current through a tension-raising transformer T, transmission-lines 1 1, and a tension-reducing transformer T' to the trolley or third rail L and the track-rail R. Connection to the car is made through the trolley $t$ and the wheels W, as usual, though obviously any other suitable arrangement may be substituted. The motor A is provided with a flux-screen $A^3$, independently rotatable in the air-gap and containing a short-circuited winding, as shown. As is well known in the art, if the flux-screen be set in rotation it will so distort the flux set up by the current flowing in the primary single-phase circuit, shown on the member A', as to produce in the induced member $A^2$ a rotary field. This rotary field generates dephased electromotive forces in the winding of the induced member $A^2$, which winding may be of any well-known type and should preferably be similar in arrangement to the windings of any ordinary multiphase generator-armature. The electromotive forces so generated cause multiphase current to flow in the circuits leading from the rings and brushes. These currents are led through condensers C C' to the inducing member B' of the motor B, in which member they produce a rotary field. This rotary field in turn generates current in the induced member $B^2$, which reacts to create torque. It will thus be seen that both motors produce a rotary effort at the start and tend to run to such a speed that the frequency of the current in the intermediate circuit, in which the phase-advancing devices are preferably interposed, is nearly one-half of the frequency of the current fed to the primary of the first motor A.

To start the flux-screen $A^3$, I provide a small auxiliary motor M, which, as it is of insignificant output, may be of the split-phase type, as shown—that is to say, it may be wound like an ordinary two-phase or three-phase motor—and provided with a monocyclic starting device, consisting of a self-induction $M'$ and a condenser or resistance $M^2$, as shown. The armature $M^3$ of this motor drives the flux-screen $A^3$ through a belt D, pulleys E F, and a second belt G. The magnets $M^a$ $M^b$ serve, when energized by the battery $b$ or other source of current, to reduce the resistance of the induced members of the motors A and B, respectively, preferably by the arrangement to be hereinafter described.

Figure 8:
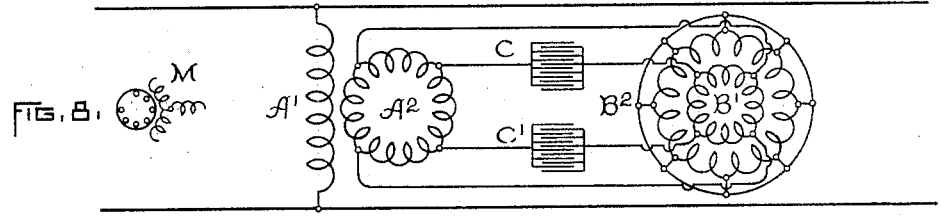
Figure 9:
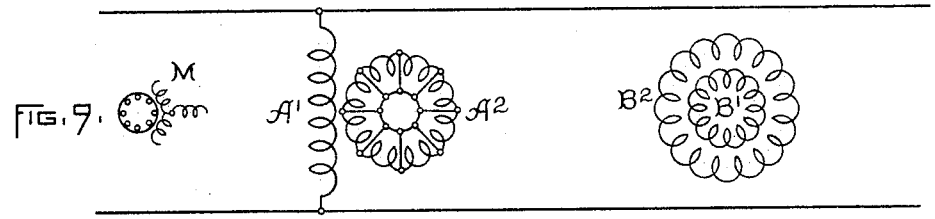
Figure 10:
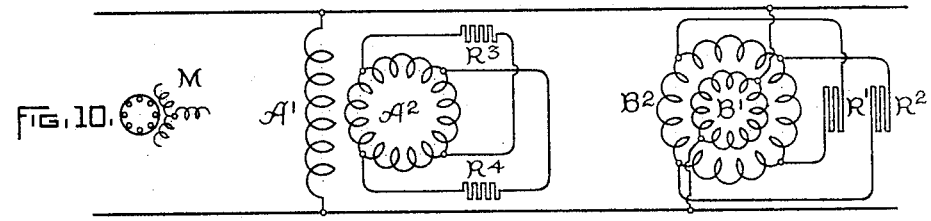
Figure 11:
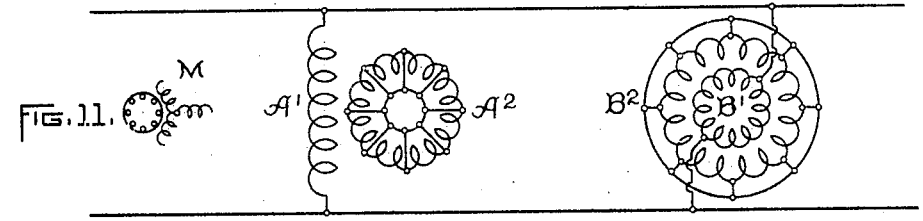

To start the motors, the controller K, here shown in development only, is shown so that the brushes 10 to 36, inclusive, bear upon the line 1. Current then flows from the trolley $t$, through brush 13, to contact-plate $13^a$ and brush 15, to the motor M, and thence to brush 12, by contact $10^a$ to brush 10, and to ground through the wheels W. It will be seen that this position simply acts to start the small motor M and the flux-screen $A^3$. The connections are indicated in diagram in Fig. 5, in which it will be seen that the primary of the motor M is energized and the secondary short-circuited upon itself, while the windings of the other members $A'$ $A^2$ $B'$ $B^2$ are deënergized. When the flux-screen has attained a sufficient speed, the controller is moved to the second position 2. Here contacts $13^a$ and $10^a$ are energized, as before, by the brushes 13 and 10, so that current flows from contact $13^a$, through brush 14, to the primary winding $A'$, through the brush 11, and to the contact $10^a$. This generates an alternating flux in the member $A'$, which is converted into a rotary flux by the action of the flux-screen $A^3$, which now, since it drives no appreciable load, runs up to a speed approaching that of synchronism. The rotary field thus induced in the secondary $A^2$ causes dephased currents to be generated in the multiphase winding of that member, supposed in this case to be a two-phase winding. Current then flows from the brush $a'$ to the condenser C, and thence, through the first section of the condenser, to the contact $16^a$ and brush 19, thence to the brush $b'$ of the motor B and, through the winding $B'$, to the brush $b^3$, to brush 21, to the controller-contact $20^a$ and brush 20, back to the motor A at the brush $a^3$. The other intermediate circuit is from the brush $a^2$ to the condenser $C'$, brush 22, contact $22^a$, brush 25, motor-brush $b^2$, through the inducing member $B'$, to the brush $b^4$, brush 27 and contact $26^a$, and thence to the brush $a^4$ on the motor A. The current passing in these paths will create a rotary field in the inducing member $B'$, which may be wound, as shown, with a ring-winding tapped at four equidistant points or with two independent circuits or in any other suitable way. This rotary field will produce electromotive forces in the bars of the winding $B^2$, which in turn will produce currents in these bars, which bars are arranged in two circuits and constitute an ordinary multiphase secondary. The terminals of these two circuits lead, respectively, to brushes 28 29 and 30 31, which brushes are united together in pairs by the resistances $R'$ $R^2$. It will thus be seen that in this position, which is illustrated in diagram in Fig. 6, the motor M is energized, the primary $A'$ is also energized with single-phase current, and the primary $B'$ of the motor B is fed with quarter-phase current from the secondary $A^2$ of the motor A through the condensers C $C'$, while the secondary $B^2$ of the motor B is closed on itself through resistances $R'$ $R^2$. The position above described is the starting position. The current flowing in the intermediate circuits of the tandem system is in general of a frequency equal to the slip of the motor A, which slip is before the motor starts equal to the frequency of the original current; but as the motor A starts the frequency of the current in the intermediate circuit falls, as is well understood. When a small speed has been attained, the controller is moved to the position 3, in which the motor M is cut out. Since the brushes 12 and 15 leave the segments $10^a$ $13^a$, an additional section of each of the condensers C $C'$ is cut in by the contact of the brushes 17 and 23 with the segments $16^a$ and $22^a$ and the resistances $R'$ $R^2$ are cut out by the action of the segment $28^b$. This position is shown in diagram in Fig. 7 and obviously corresponds to a slightly higher speed in the motor. In the next position, in which the brushes rest upon the line 4, the whole capacity is cut in, since all of the brushes 16 17 18 and 22 23 24 are on the segments $16^a$ $22^a$, respectively, and in addition it will be observed that the brushes 32 and 33 rest upon the segments $32^a$. This makes the circuit from battery $b$, through the magnet $M^b$, to the brush 32, contact $32^a$, brush 33, and back to the battery. This energizes the magnet $M^b$ and short-circuits on itself the whole winding $B^2$ in small sections instead of simply connecting together the terminals of this winding, so that its resistance is considerably diminished. This position, which is indicated in Fig. 8, is obviously the full tandem position, in which the motors will run to nearly half of their synchronous speed. In position 5 it will be noticed that the brush 34 also rests upon the segments $32^a$, so that the magnet $M^a$ is energized. This short-circuits on itself the winding $A^2$, which practically cuts off current from the intermediate circuits and from the motor B, owing to the low resistance of the short circuit. It is now safe to open the intermediate circuits, which is accordingly done in the sixth position. (Illustrated in diagram in Fig. 9.) The seventh position connects the motors in multiple. Current enters at the brush 13, as before, and passes to the segment $13^a$, where it divides, a portion passing by brush 14, through the primary $A'$ of the motor A, and then through the brush 11 to the segment $10^a$. A second path, however, is found from cross connection to the segment $21^a$ and brush 21 to brush $b^3$ of the motor B, thence through the primary $B^2$ of the motor B, out by the brush $b'$ to brush 19, segment $19^a$, and cross connection to the segment $10^a$. This connects the two motors in multiple as single-phase machines. The brush $a^3$ of the motor A is connected, through the brush 20 on the controller, to the contact $20^b$, thence through the resistance $R^3$ to the contact $35^a$ and by brush 35 to the brush $a'$. A second circuit leads from the brush $a^2$, through the brush 36, to segment $36^a$, resistance $R^4$, contact $26^b$, brush 26, to the brush $A^4$ of the motor A. These connections short-circuit the secondary $A^2$ on itself through the resistances $R^3$ $R^4$. The secondary $B^2$ of the motor B is short-circuited on itself through resistances as in the second position, since the segments $28^c$ $29^c$ $30^c$ $31^c$ are cross-connected to the contacts $28^a$ $29^a$ $30^a$ $31^a$. This connection is shown in Fig. 10 and is simply a multiple connection of single-phase motors, but running at half speed with resistance in their secondaries. In such circumstances the two motors will evidently tend to run up to synchronism by an amount depending merely on the magnitude of the resistances. In the eighth position the connections are the same, except that the resistances $R'$ $R^2$ $R^3$ $R^4$ are displaced by short-circuiting leads. The ninth and last position (shown in Fig. 11) omits the contacts $20^b$ $20^c$, &c., and short-circuits both secondaries on themselves by means of the magnets $M^a$ $M^b$, energized from the battery B through the contact $32^b$. In this position the motors will tend to approach very near to synchronous speed.

I have illustrated my short-circuiting arrangement in Figs. 2, 3, and 4 as applied to the rotor $A^2$ of Fig. 1, though a similar arrangement will obviously be applied to the stator $B^2$ of the same figure. In these drawings $A^4$ $A^4$ are the bars of the winding (shown developed in Fig. 4) connected together, as shown, to form an ordinary two-phase winding having free terminals at $a'$ $a^2$ $a^3$ $a^4$ corresponding to the brushes $a'$ $a^2$ $a^3$ $a^4$ of Fig. 1. The magnets $M^a$ $M^a$, Fig. 4, serve to attract the short-circuiting bar $A^5$, which is furnished with spring-contacts $a^6$ $a^6$ against various segments $a^7$, connected to the bars $A^4$. It will be seen that while the magnets $M^a$ are deënergized the springs $A^7$ $A^7$ will draw down the short-circuiting bar $A^5$ against the stops $A^8$ $A^8$, and the bars $A^4$ will be connected like the bars of an ordinary two-phase winding. If, however, the magnets $M^a$ $M^a$ are energized, the short-circuiting bar $A^5$ will be attracted, and the bars will be short-circuited on themselves in pairs, or singly, according to connections.

In practice I prefer to replace the short-circuiting bar $A^5$ by the plate $A^5$ of Figs. 2 and 3, which serves the same function, sliding directly upon the shaft of the machine. This disk $A^5$ is preferably formed of two portions—an inner and an outer—insulated from each other, as shown, and is pulled away from the bars $A^4$ by springs $A^7$ $A^7$. A magnet-coil $M^a$ is energized by current led in through a suitable ring $A^9$ and out by the shaft. This magnet-coil serves to energize a cup-shaped core $A^{10}$, which attracts the inner magnetic portion of the disk $A^5$, whose outer portion is preferably made of copper to short-circuit the bars $A^4$.

The necessity for the use of condensers or equivalent devices in the independent circuits of a tandem system is explained in my prior patent, No. 587,937, dated August 10, 1897. I have shown in Fig. 1 condensers interposed directly in the circuits; but I prefer in most instances to interpose the condensers inductively. I have illustrated such an arrangement in Fig. 12, in which $P'$ $P^2$ $P^3$ are the three leads of the intermediate circuits of a three-phase tandem-motor system or of any other three-phase system, which may obviously be substituted for the two-phase motor system shown in Fig. 1. In each one of these leads I place a very coarse transformer primary lettered $Q'$ $Q^2$ $Q^3$, respectively. The secondaries $Q^4$ $Q^5$ $Q^6$ of these transformers are connected at one end to a common point through a three-phase condenser V and at the other end are connected to brushes $3'$ $6'$ $9'$. From intermediate points of these secondaries are taken out leads to the brushes $2'$ $5'$ $8'$ and to the brushes $1'$, $4'$, and $7'$. The condenser-switch is shown at X and consists of an arrangement which first connects together the brushes $1'$ $4'$ $7'$, then the brushes $2'$ $5'$ $8'$, and finally the brushes $3'$ $6'$ $9'$. This varies the voltage upon the condenser, and thus varies the effect upon the phase displacement. This method of neutralizing or adjusting the lag in the intermediate circuits of a tandem system is not confined to the particular system shown or to any particular number of phases, but is applicable generally to tandem systems and in some respects to multiphase systems generally.

It is obvious that various changes may be made without departing from the spirit and scope of my invention. In particular I do not limit myself to the specific single-phase motor shown.

What I claim as new, and desire to secure by Letters Patent of the United States, is—

1. The combination with a source of single-phase current, of a motor driven by electric energy from said source, a multiphase winding on the secondary of said motor, leads from said secondary to the primary of a second motor, and a secondary for said second motor, the two motors being coupled to perform mechanical work.

2. The combination with a source of single-phase current, of a motor driven by electric energy from said source, a multiphase winding on the secondary of said motor, leads from said secondary to the primary of a second motor, and a secondary for said second motor, the two motors being arranged to drive the same load.

3. The combination with a source of single-phase current, of a motor driven by electric energy from said source, a multiphase winding on the secondary of said motor, leads from said secondary to the primary of a second motor, and a secondary for said second motor, the two motors being coupled to perform mechanical work, and means for neutralizing or adjusting the phase displacement in the intermediate circuits.

4. The combination with a single-phase motor driving a load, of a multiphase motor connected in tandem with the single-phase motor, and also driving a load.

5. The combination with a single-phase motor, a multiphase motor in tandem therewith, and adjustable means for neutralizing the phase displacement of the intermediate circuits.

6. The combination of a single-phase motor, a multiphase motor having a variable-resistance secondary, and a switching device for connecting the two motors in tandem and for varying said resistance.

7. The combination of a single-phase motor, a multiphase motor having a variable-resistance secondary, and a switching device for connecting the two motors in tandem and for varying said resistance as well as the reactance of the intermediate circuits.

8. The combination with an alternating-current motor, of means for producing a rotary field therein by energy derived from a single-phase alternating current, a load for said motor, connections from the secondary of said motor, to a multiphase motor also driving a load, and a secondary for said multiphase motor.

9. The combination with a single-phase motor, of a multiphase motor, means for connecting the two motors in tandem to a source of single-phase current, for varying the speed of said motors, and for finally connecting the two motors in multiple to the said source.

10. The combination with a single-phase motor of a multiphase motor and a switch and coöperating circuits for connecting the two motors in tandem to a source of single-phase current, to vary the speed of said motors, the switch being also arranged to vary the reactance of the intermediate circuits.

11. The combination with two motors, of means for reducing the effective resistance of a winding on the secondary of the first motor, and means for connecting said motors in tandem.

12. A tandem-motor system in which the first motor is provided with a secondary wound with a multiple winding, with means for short-circuiting conductors of said winding to reduce the resistance of the winding, and means for connecting the motors in tandem or disconnecting them.

13. The combination with a set of multiphase leads, of transformers each having its primary inserted in series in one of the leads a condenser and connections between the condenser and the secondaries of the transformers.

14. The combination with a set of multiphase leads, of transformers each having its primary inserted in series in one of the leads, the secondaries of the transformers being connected together at one end, and connected at the other end to different portions of a single condenser, and means for varying the effective length of said secondaries.

In witness whereof I have hereunto set my hand this 1st day of April, 1898.

ALBERT G. DAVIS.

Witnesses:
B. B. HULL,
M. H. EMERSON.